(12) United States Patent
Beaudoin et al.

(10) Patent No.: US 11,634,158 B1
(45) Date of Patent: Apr. 25, 2023

(54) CONTROL PARAMETER BASED SEARCH SPACE FOR VEHICLE MOTION PLANNING

(71) Applicant: Motional AD LLC, Boston, MA (US)

(72) Inventors: Robert Beaudoin, Boston, MA (US); Benjamin Riviere, Boston, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/835,789

(22) Filed: Jun. 8, 2022

(51) Int. Cl.
| | | |
|---|---|---|
| *B60W 60/00* | (2020.01) | |
| *G05D 1/02* | (2020.01) | |
| *G06N 7/00* | (2006.01) | |
| *G06N 3/08* | (2006.01) | |
| *G06N 3/084* | (2023.01) | |

(52) U.S. Cl.
CPC ....... *B60W 60/0015* (2020.02); *G05D 1/0221* (2013.01); *G05D 1/0274* (2013.01); *G06N 3/084* (2013.01); *G06N 7/005* (2013.01); *G05D 2201/0213* (2013.01)

(58) Field of Classification Search
None
See application file for complete search history.

(56) References Cited

U.S. PATENT DOCUMENTS 10,133,275 B1 * 11/2018 Kobilarov ................ G06N 3/08
10,671,076 B1 * 6/2020 Kobilarov ............ G05D 1/0214
701/24

* cited by examiner

*Primary Examiner* — Abdhesh K Jha
(74) *Attorney, Agent, or Firm* — Mintz, Levin, Cohn, Ferris, Glovsky and Popeo, P.C.

(57) ABSTRACT

A method for generating a trajectory for a vehicle based on an abstract space of control parameters associated with the vehicle may include applying a machine learning model to determine an abstract space representation of the trajectory, which includes a sequence of control parameters associated with the vehicle. For instance, application of the machine learning model may include performing a search of the abstract space parameterized by control parameters that include derivatives of the position of the vehicle. Examples of control parameters include velocity, acceleration, jerk, and snap. A physical space representation of the trajectory may be determined by at least mapping the sequence of control parameters to a sequence of positions for the vehicle. A motion of the vehicle may be controlled based at least on the physical space representation of the trajectory. Related systems and computer program products are also provided.

28 Claims, 13 Drawing Sheets

CONTROL PARAMETER BASED SEARCH SPACE FOR VEHICLE MOTION PLANNING

BACKGROUND

An autonomous vehicle is capable of sensing and navigating through its surrounding environment with minimal to no human input. To safely navigate the vehicle along a selected path, the vehicle may rely on a motion planning process to generate and execute one or more trajectories through its immediate surroundings. The trajectory of the vehicle may be generated based on the current condition of the vehicle itself and the conditions present in the vehicle's surrounding environment, which may include mobile objects such as other vehicles and pedestrians as well as immobile objects such as buildings and street poles. For example, the trajectory may be generated to avoid collisions between the vehicle and the objects present in its surrounding environment. Moreover, the trajectory may be generated such that the vehicle operates in accordance with other desirable characteristics such as path length, ride quality or comfort, required travel time, observance of traffic rules, adherence to driving practices, and/or the like. The motion planning process may further include updating the trajectory of the vehicle and/or generating a new trajectory for the vehicle in response to changes in the condition of the vehicle and its surrounding environment.

DETAILED DESCRIPTION

Figure 1:
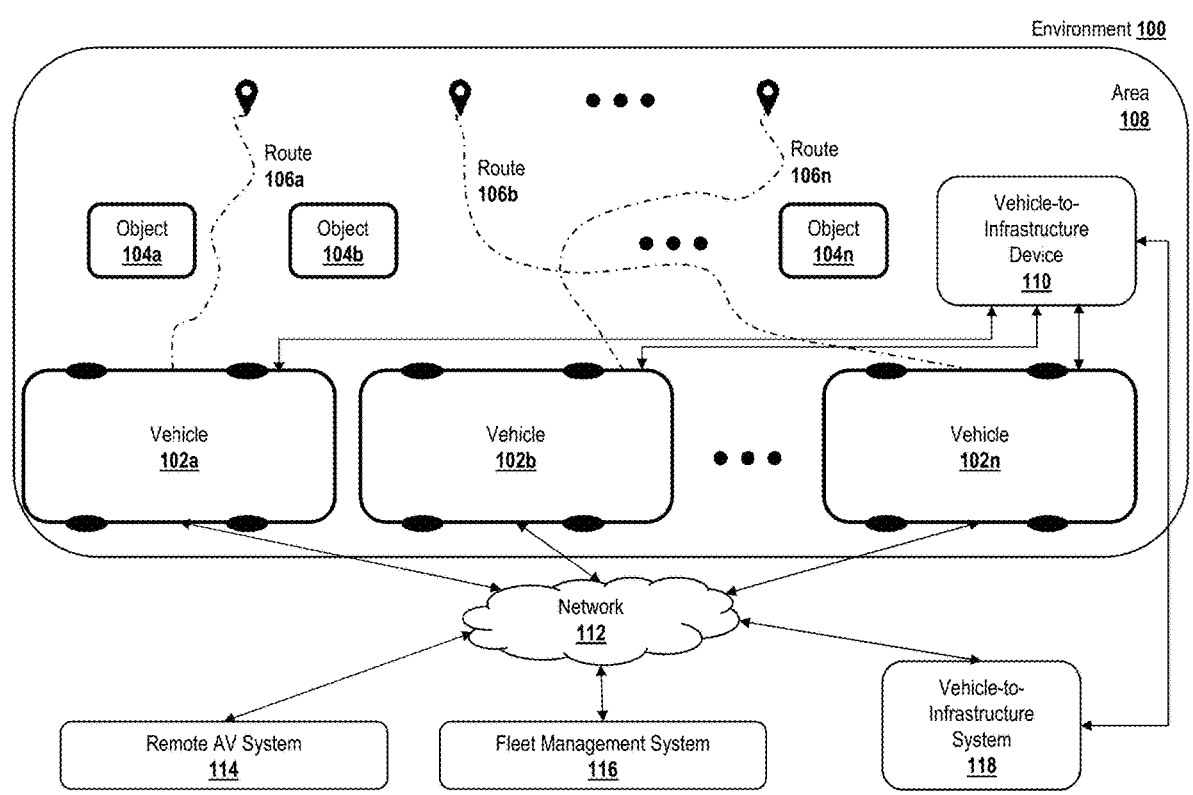
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a motion planner for a vehicle (e.g., an autonomous vehicle) that generates a trajectory for the vehicle based on an abstract space of control parameters associated with the vehicle. The resulting trajectory may be used to control the motion of the vehicle in a manner that avoids a collision between the vehicle and one or more objects in the vehicle's surrounding environment. Moreover, in some instances, by confining the abstract space based on certain kinematic constraints and/or physical constraints associated with the vehicle, the resulting trajectory may also satisfy additional desirable characteristics such as, for example, path length, ride quality or comfort, required travel time, observance of traffic rules, adherence to driving practices, and/or the like.

By virtue of the implementation of systems, methods, and computer program products described herein, techniques for motion planning as well as for training a machine learning model that is used for motion planning are provided. For example, a machine learning model may be trained to generate an abstract space representation of the trajectory that includes a sequence of control parameters for the vehicle. The control parameters may include one or more derivatives of a position of the vehicle such as, for example, velocity, acceleration, jerk, snap, and/or the like. A physical space representation of the trajectory may be determined by mapping the sequence of control parameters to a sequence of positions for the vehicle such as, for example, a sequence of two-dimensional spatial coordinates or three-dimensional spatial coordinates for the vehicle. The mapping from the sequence of control parameters to the sequence of positions may be accomplished by solving an initial value problem in which a first function mapping the sequence of control parameters to discrete time steps is integrated to generate a second function mapping the sequence of positions to discrete time steps. The second function mapping the sequence of positions to discrete time steps may be further determined based on one or more initial conditions associated with the vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory)

connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
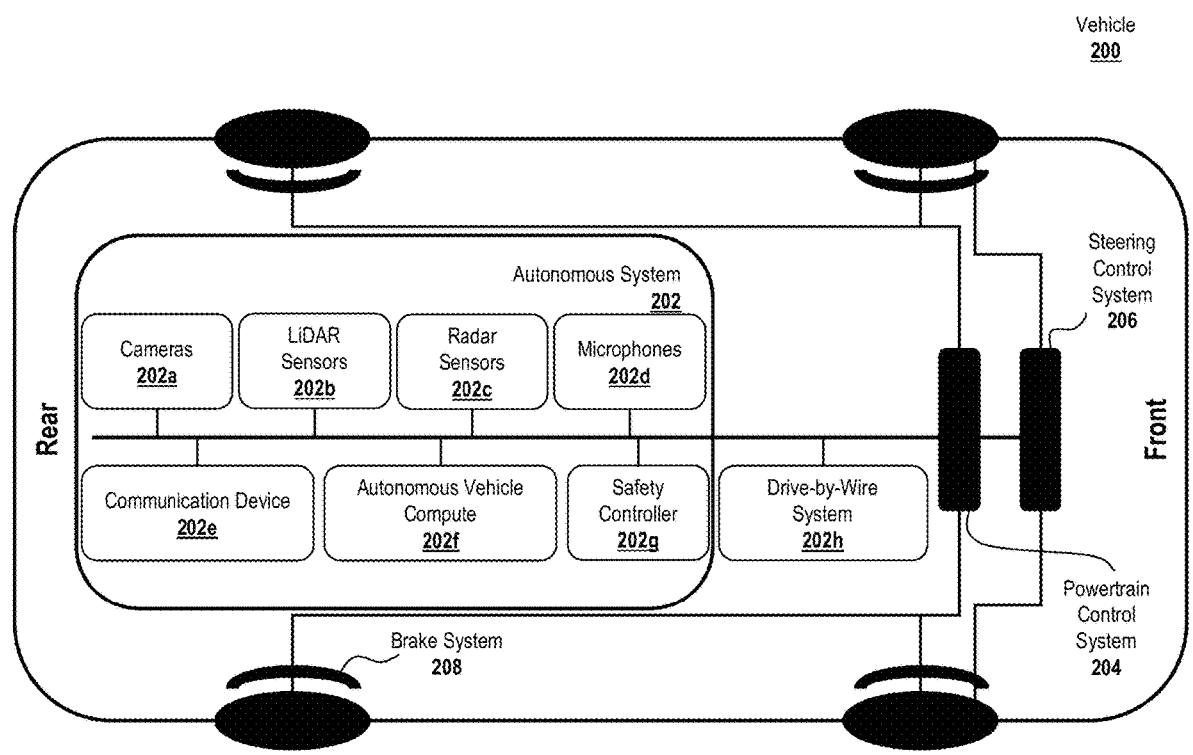
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
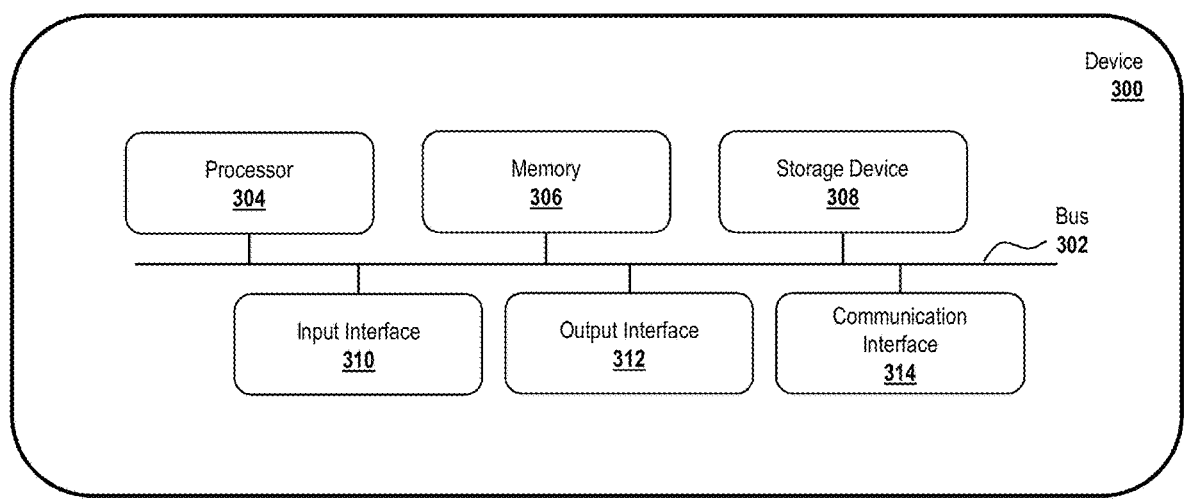
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of the system 500, and/or one or more devices of network 112 (e.g., one or more devices of a system of network 112). In some embodiments, one or more devices of vehicles 102 (e.g., one or more devices of a system of vehicles 102), one or more devices of the system 500, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
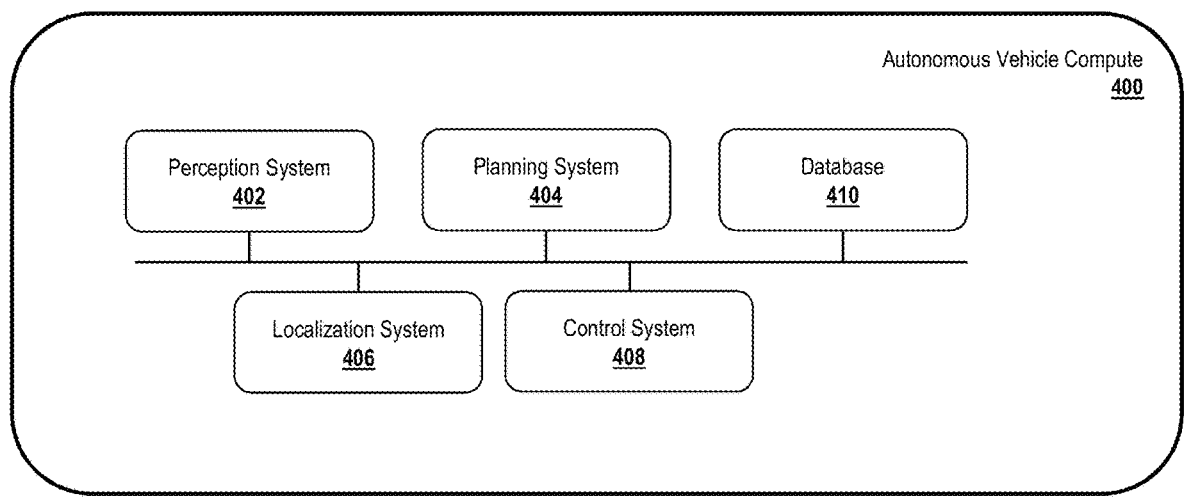
FIG. 4A is a diagram of certain components of an autonomous system.
Figure 4B:
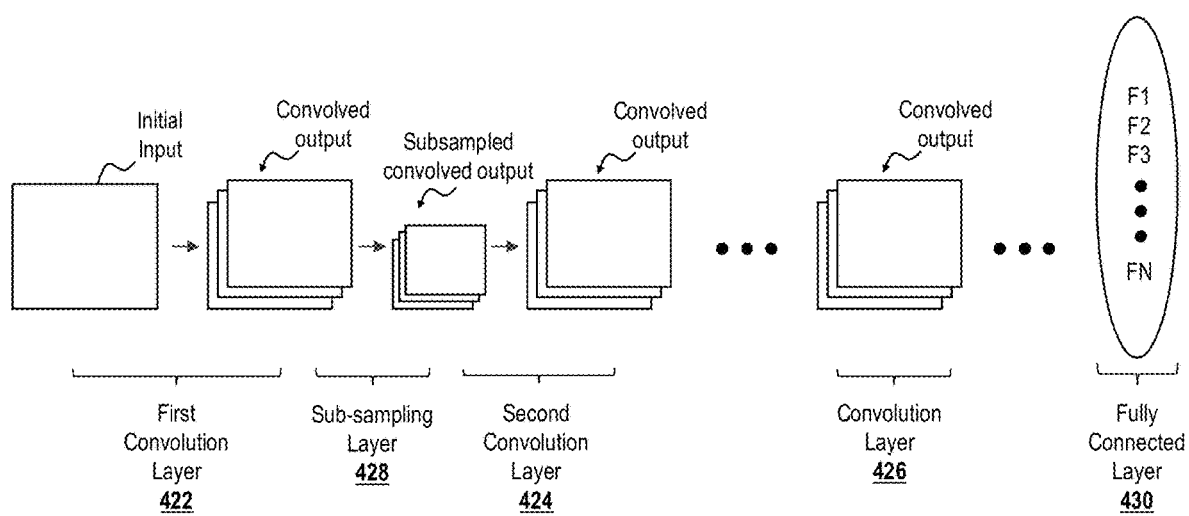
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
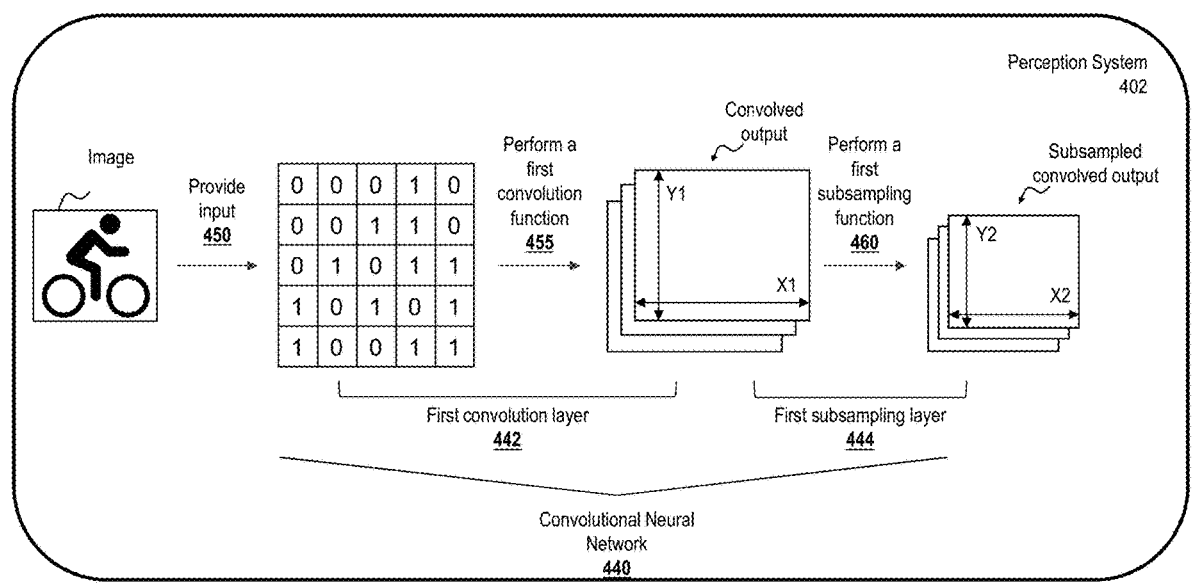
FIGS. 4C and 4D are a diagram illustrating example operation of a CNN.
Figure 4D:
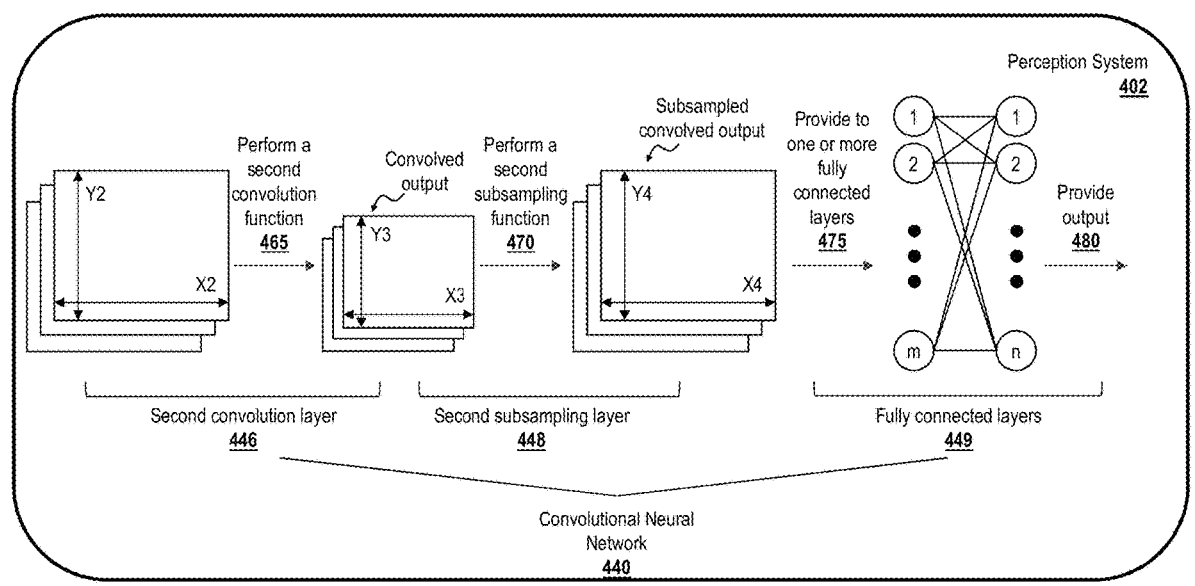

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5A:
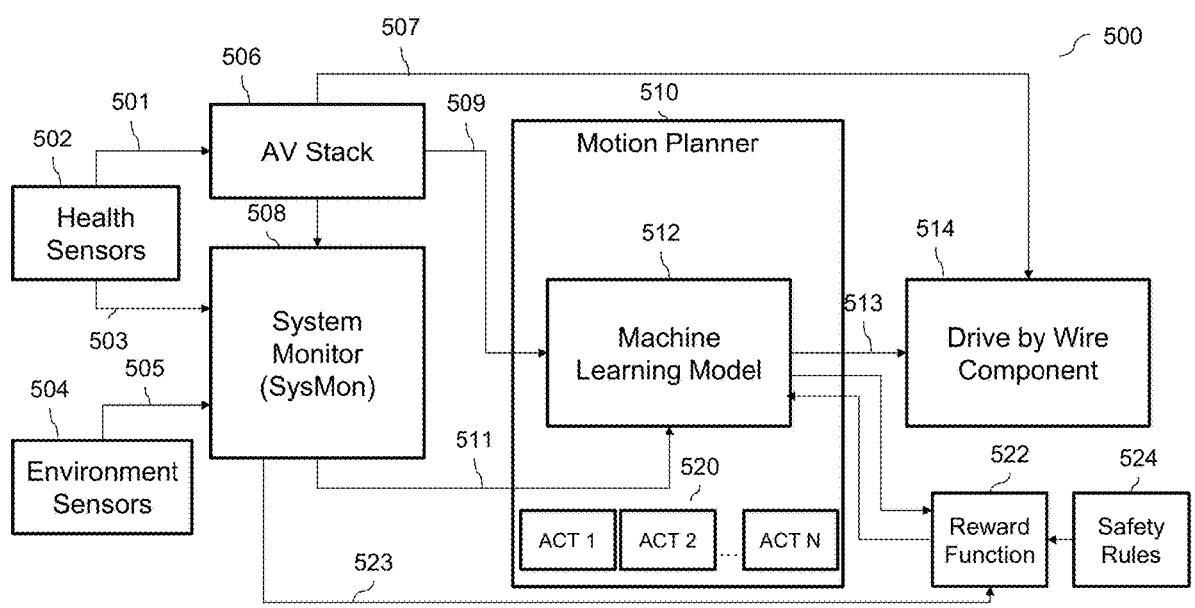
FIG. 5A is a block diagram illustrating an example of a system for generating a trajectory for a vehicle.
Figure 5B:
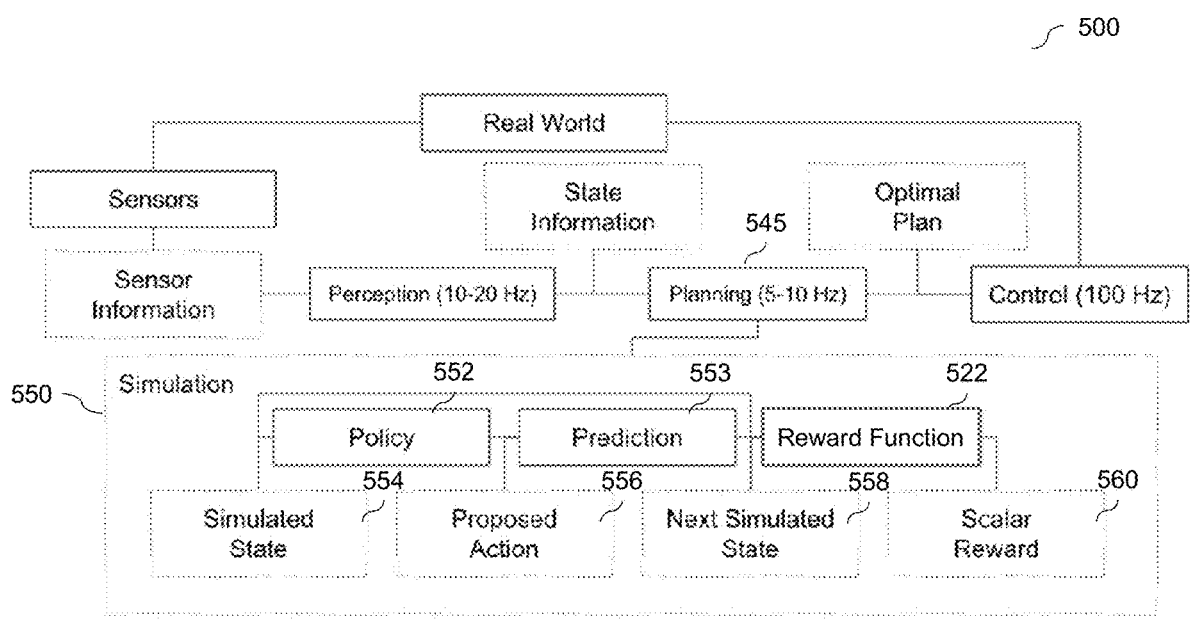
FIG. 5B is a block diagram illustrating an example of a system for generating a trajectory for a vehicle.

Referring now to FIGS. 5A-5B, illustrated are diagrams of a system 500 for implementing a process for generating a trajectory for a vehicle, according to some embodiments of the current subject matter. The system 500 can be incorporated into a vehicle (e.g., vehicle 102 shown in FIG. 1, vehicle 200 shown in FIG. 2, etc.). The system 500 includes one or more health sensors 502, one or more environment sensors, an AV stack 506, a system monitor (SysMon) 508, a motion planner 510, and a drive-by-wire component 514. The system 500 can also incorporate a reward function component 522 and a safety rules component 524, one or both of which can be stored by the vehicle's systems.

The motion planner 510 may apply a machine learning model 512 (such as those discussed in connection with FIGS. 4B-D above) in order to generate a trajectory that includes a sequence of actions (ACT 1, ACT 2, . . . ACT N) 520. The trajectory (e.g., the sequence of actions 520 can be stored as a set of instructions that can be used by the vehicle during drive time to execute a particular maneuver. The machine learning model 512 may be trained to generate a trajectory that is consistent with the vehicle's current scenario, which may include a variety of conditions monitored by the vehicle's systems. For example, the vehicle's current scenario may include the pose (e.g., position, orientation, and/or the like) of the vehicle and that of the objects present in the vehicle's surrounding environment. Additionally, or alternatively, the vehicle's current scenario may also include the vehicle's state and/or health such as, for example, heading, driving speed, tire inflation pressure, oil level, transmission fluid temperature, and/or the like. The conditions associated with the vehicle's current scenario may serve as inputs to the machine learning model 512, which may be trained to generate a correct trajectory for the vehicle given its current scenario. For instance, the correct trajectory for the vehicle may be a sequence of actions 520 that avoids collision between the vehicle and one or more objects in the vehicle's surrounding environment. In some instances, the correct trajectory for the vehicle may further enable the vehicle to operate in accordance with certain desirable characteristics such as path length, ride quality or comfort, required travel time, observance of traffic rules, adherence to driving practices, and/or the like.

In some cases, the machine learning model 512 may be trained through inverse reinforcement learning (IRL) in which the machine learning model 512 is trained to learn the reward function 522 based on demonstrations of expert behavior policy (e.g., one or more simulations) that includes the correct trajectories for the vehicle encountering a variety of scenarios. The reward function 522 may assign, to a sequence of actions 520 forming a trajectory for the vehicle, a cumulative reward corresponding to how closely the trajectory matches a correct trajectory (e.g., a trajectory that is most consistent with expert behavior) for the vehicle's current scenario. Accordingly, by maximizing the reward assigned by the reward function 522 when determining a trajectory for the vehicle, the machine learning model 512 may thereby determine a trajectory (e.g., the sequence of actions 520) that is most consistent with expert behavior given the vehicle's current scenario. For example, a trajectory that is consistent with expert behavior may avoid collision between the vehicle and one or more objects in the vehicle's surrounding environment. Additionally, or alternatively, a trajectory that is consistent with expert behavior may enable the vehicle to operate in accordance with certain desirable characteristics such as path length, ride quality or comfort, required travel time, observance of traffic rules, adherence to driving practices, and/or the like.

In some embodiments, the machine learning model 512 may determine a trajectory for the vehicle by searching a large search space of possible trajectories to identify, based on the reward function 522, a trajectory that is most consistent with expert behavior. For example, the machine learning model 512 may determine a trajectory for the vehicle by performing a Monte Carlo tree search (MCTS) in which the trajectory is selected from the explored portion of the search space or an unexplored portion of the search space. In the latter case, an unexplored portion of the search space may be explored by expanding the search space and performing one or more simulations to determine the rewards associated with the trajectories occupying the unexplored portion of the search space.

To further illustrate, FIG. 5B depicts a block diagram illustrating another example of the system 500 for generating a trajectory for a vehicle in which motion planning 545 for the vehicle may include performing one or more simulations 550 to explore the unexplored portions of a search space (e.g., a search tree). As noted, motion planning 545 may be performed by the motion planner 510 which, in some embodiments, is a part of the planning system 404. As shown in FIG. 5B, a policy 552 may be applied during the simulation 550 to determine, based at least on a current simulated state 554 of the vehicle, a proposed action 556. Performing the proposed action 556 while the vehicle is in the current simulated state 554 may trigger a transition from the current simulated state 554 to a next simulated state 558. As shown in FIG. 5B, a prediction 553 including the next simulated state 558 may be made. Moreover, a scalar reward 560 associated with the transition from the current simulated state 554 to the next simulated state 558 may be determined, for example, based on the reward function 522. Accordingly, the cumulative reward associated with a trajectory that includes the proposed action 556 may include the scalar reward 560. Furthermore, a trajectory including the proposed action 556 may be selected if that trajectory is most consistent with expert behavior as indicated by the cumulative reward associated with the trajectory.

Referring again to FIG. 5A, the vehicle may include health sensors 502 and environment sensors 504 for measuring and/or monitoring various conditions at or around the vehicle. For example, the vehicle's health sensors 502 may monitor various parameters associated with the vehicle's state and/or health. Examples of state parameters may include heading, driving speed, and/or the like. Examples of health parameters may include tire inflation pressure, oil level, transmission fluid temperature, etc. In some embodiments, the vehicle include separate sensors for measuring and/or monitoring its state and health. The health sensors 502 provide data corresponding to one or more parameters of the vehicle's current state and/or health to the AV stack 506, at 501, and system monitor 508, at 503.

The vehicle's environment sensors (e.g., camera, LIDAR, SONAR, etc.) 504 may monitor various conditions present in the vehicle's surrounding environment. Such conditions may parameters of other objects present in the vehicle's surrounding environment such as the speed, position, and/or orientation of one or more vehicles, pedestrians, and/or the like. As shown in FIG. 5A, the environment sensors 504 may supply data corresponding to one or more parameters of the vehicle's surrounding environment to the system monitor 508, at 505.

In some embodiments, the AV stack 506 controls the vehicle during operation. Additionally, the AV stack 506 may provide various trajectories (e.g., stop in lane, pull over, etc.) to the motion planner 510, at 509, and provide one or more signals (including signals associated with execution of a selected MRM) 507 to the drive-by-wire component 514. The drive-by-wire component 514 may use these signals to operate the vehicle.

The system monitor 508 receives vehicle and environment data 503, 505 from the health sensors 502, 504, respectively. It then processes the data and supplies to the motion planner 510, and in particular, to the machine learning model 512, at 511, the processed data. The machine learning model 512 uses data 509, 511, as received from the AV stack 506 and system monitor 508, respectively to generate a trajectory, including the sequence of actions 520, for the vehicle. Once the trajectory has been determined by the machine learning model 512, the motion planner 510 may transmit one or more signals 513 indicative of the trajectory to the drive-by-wire component 514.

In some embodiments, one or more trajectories for the vehicle (e.g., sequences of actions 520) can be pre-loaded/pre-stored by the system 500. Moreover, the motion planner 510 can, such as, during training of the machine learning model 512, generate and store additional trajectories and/or refine the pre-loaded/pre-stored trajectories as well as refine generated trajectories upon receiving further sensor data and/or any other information associated with the vehicle's health, environment, etc. In addition to the provided sensor data and/or pre-loaded/pre-stored trajectories, the machine learning model 512 can be trained to implement one or more safety rules 524 and reward values provided by the reward function 522. Reward values are generated based on the data 523 (e.g., vehicle's conditions, conditions present in the vehicle's surrounding environment, and/or the like) supplied to the reward function 522 from the system monitor 508, any trajectories that may have been generated (or selected), as well as safety rules 524.

Referring now to FIGS. 6-10, illustrated are diagrams of an implementation of a process for generating a trajectory for a vehicle based on an abstract space parameterized by one or more control parameters of the vehicle. For example, a motion planner (e.g., the motion planner 510) may generate, based on an abstract space parameterized by derivatives of a position of a vehicle, one or more trajectories for navigating the vehicle (e.g., an autonomous vehicle such as vehicles 102a-102n, vehicles 200, and/or the like) along a selected path. For example, the motion planner may generate, at successive time intervals, trajectories for the vehicle that are consistent with the conditions present during each time interval. Accordingly, the motion planner may generate, based on the conditions present at a first time $t_1$, a first trajectory for the vehicle before updating the first trajectory or generating a second trajectory for the vehicle based on the conditions that are present at a second time $t_2$. The conditions that may be present at the first time $t_1$ and the second time $t_2$ may include the pose (e.g., position, orientation, and/or the like) of the vehicle and that of each object present in the vehicle's surrounding environment.

The motion planner may include a machine learning model (e.g., the machine learning model 512) trained to generate, for a variety of scenarios that the vehicle may encounter, a trajectory that includes a sequence of actions (sometimes referred to as maneuvers) for navigating the vehicle along a selected path. As described above, the correct trajectory for a scenario may be one that is most consistent with expert behavior. For example, the correct trajectory for a scenario may be a trajectory that avoids a collision between the vehicle and one or more objects in the vehicle's surrounding environment. Moreover, in some instances, the correct trajectory for a scenario may be a trajectory that enables the vehicle to operate in accordance with certain desirable characteristics including, for example, path length, ride quality or comfort, required travel time, observance of traffic rules, adherence to driving practices, and/or the like.

The machine learning model may be trained through reinforcement learning in which the machine learning model is trained to learn a policy that maximizes the cumulative value of a reward function R. Examples of reinforcement learning techniques include inverse reinforcement learning (IRL), associative reinforcement learning, deep reinforcement learning, safe reinforcement learning, and partially supervised reinforcement learning (PSRL). A policy in the context of motion planning may indicate the probability of the machine learning model selecting a particular action (e.g., from a set of possible actions) given the current scenario (or state) of the vehicle. The current scenario of the vehicle may include the pose (e.g., position, orientation, and/or the like) of the vehicle and that of each object present in the vehicle's surrounding environment. While each action may be associated with an immediate reward, the machine learning model may be trained to select an action that maximizes the cumulative reward of the entire sequence of actions forming the trajectory that is generated by the machine learning model. This trajectory may be associated with a maximum cumulative reward by avoiding a collision between the vehicle and the objects present in the vehicle's surrounding environment. Alternatively and/or additionally, the trajectory may be associated with a maximum cumulative reward by enabling enable vehicle to operate in accordance with certain desirable characteristics including, for example, path length, ride quality or comfort, required travel time, observance of traffic rules, adherence to driving practices, and/or the like.

Figure 6:
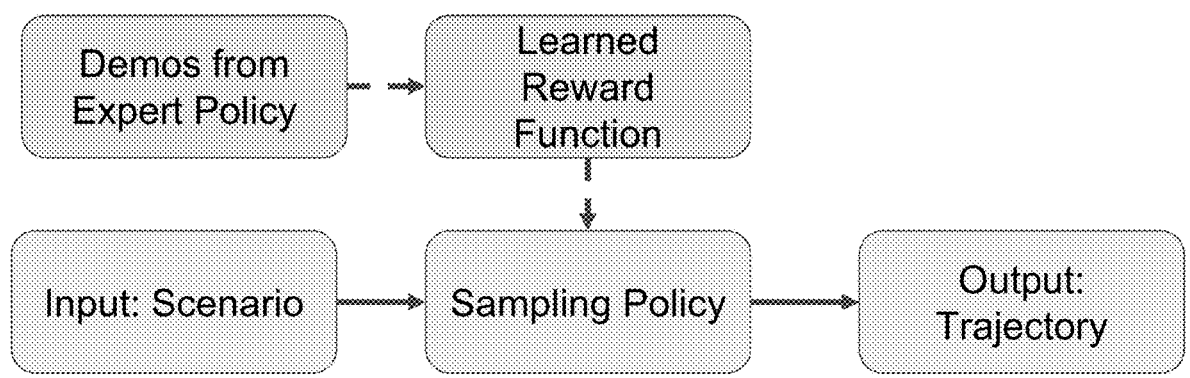
FIG. 6 is a flowchart illustrating an example of a process for training a machine learning model through inverse reinforcement learning (IRL)

FIG. 6 depicts a flowchart illustrating an example of a process for training the machine learning model through inverse reinforcement learning (IRL). In instances where the machine learning model is subjected to inverse reinforcement learning (IRL), the training of the machine learning model may include learning a reward function R that is consistent with expert behavior. For example, FIG. 6 shows that the machine learning model may be trained to learn the reward function R based on demonstrations of expert behavior, which may include the correct trajectories for the vehicle encountering a variety of scenarios. As such, the machine learning model may apply the learned reward function R when generating, for an input including a current scenario of the vehicle, an output including a trajectory for the vehicle. For instance, to generate the trajectory of the vehicle, the machine learning model may sample a set of possible actions for the vehicle and apply the learned reward function R to determine the reward associated with each action.

Figure 7:
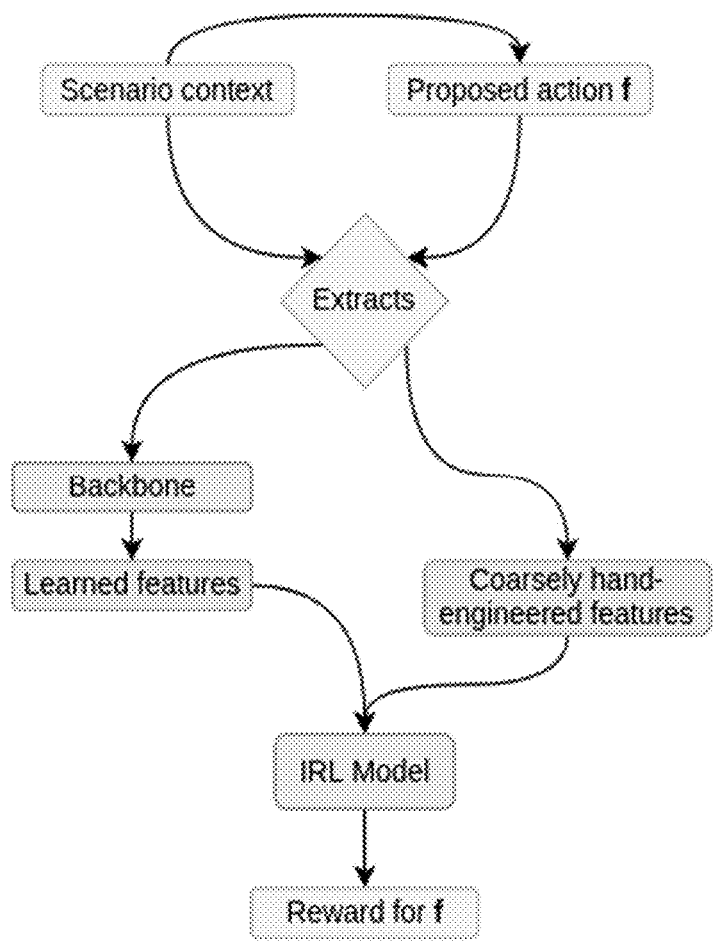
FIG. 7 depicts a flowchart illustrating an example of a process in which a machine learning model determines the reward for a proposed action.

FIG. 7 depicts a flowchart illustrating an example of a process in which the machine learning model determines the reward for a proposed action f. As shown in FIG. 7, the scenario of the vehicle and the action f may be associated with one or more features. Examples of features include collision with other tracks, distance to goal, vehicle lateral acceleration, vehicle speed, heading alignment, proximity to route centerline, and trajectory coupling. Some features may be learned features extracted by the machine learning model (e.g., the "backbone" or feature extraction network of the machine learning model) while other features may be hand-crafted features extracted by a separate algorithm. Through training such as inverse reinforcement learning (IRL), the machine learning model may learn, for each feature, a feature weight corresponding to how important the feature is in determining the next action in the trajectory of the vehicle. For example, vehicle lateral acceleration may be associated with a first feature weight that is higher than a second feature weight of heading alignment but lower than a third feature weight associated with proximity to route centerline. Accordingly, in the example shown in FIG. 7, the trained machine learning model may apply, to the features of the scenario and the proposed action f, the learned feature weights to determine a reward for the proposed action f. The machine learning model may further generate a trajectory for the vehicle to include (or exclude) the proposed action f based on the reward associated with the proposed action f.

As described above, motion planning for the vehicle may include applying a machine learning model (e.g., the machine learning model 512), which searches a search space of possible trajectories in order to identify a trajectory for the vehicle that is most consistent with expert behavior given the vehicle's current scenario. In some embodiments, the machine learning model may search an abstract space parameterized by one or more control parameters for the vehicle instead of a physical space parametrized by one or more positions of the vehicle. Accordingly, the machine learning model may be applied to determine an abstract space representation of the trajectory that includes a sequence of control parameters before the sequence of control parameters is mapped to a sequence of positions to form a physical space representation of the trajectory.

In some cases, the control parameters may include one or more derivatives of a position of the vehicle such as, for example, velocity, acceleration, jerk, snap, and/or the like. Alternatively, changes in a control parameter, such as velocity, acceleration, jerk, or snap, over the course of a trajectory may be modeled with multiple parameters such as a low-degree polynomial. For example, the abstract space representation of the trajectory may include a first control parameter of the vehicle (e.g., a first velocity, acceleration, jerk, or snap) at a first time $t_1$ followed by a second control parameter of the vehicle (e.g., a second velocity, acceleration, jerk, or snap) at a second time $t_2$. The first control parameter of the vehicle (e.g., a first velocity, acceleration, jerk, or snap) at the first time $t_1$ and the second control parameter of the vehicle (e.g., a second velocity, acceleration, jerk, or snap) at the second time $t_2$ may be mapped, for example, by solving a corresponding initial value problem, to a first position of the vehicle at the first time $t_1$ and the second position of the vehicle at the second time $t_2$. Although various embodiments described herein include one or more derivatives of the position of the vehicle as examples of control parameters, it should be appreciated that other examples of control parameters are also possible.

The abstract space and the search thereof may be constrained to reflect one or more kinematic constraints and/or physical constraints associated with the vehicle. For example, the abstract space and the search thereof may be constrained to exclude control parameters (e.g., velocity, acceleration, jerk, or snap) that are physically infeasible for the vehicle or are associated with undesirable characteristics (e.g., poor ride quality or comfort). Accordingly, the resulting trajectories, upon being mapped from the abstract space to the physical space, are more compatible with the vehicle and more consistent with expert policies while exhibiting fewer and less prominent artifacts. By contrast, a physical space parameterized by the positions of the vehicle may be populated by a disproportionately large quantity of physically infeasible or undesirable trajectories. Constraining the physical space or a search thereof to physically realizable or desirable trajectories is not practicable. As such, a trajectory generated by a search of the physical space is agnostic to the kinematic constraints and/or physical constraints of the vehicle, and is therefore less compatible with the vehicle and less consistent with expert policies.

In some embodiments, application of the machine learning model (e.g., the machine learning model 512) may include performing a Monte Carlo tree search of an abstract space to determine the abstract space representation of the trajectory. To further illustrate, FIG. 8 is a schematic diagram illustrating an example of a Monte Carlo tree search (MCTS), which may be performed by a motion planner (e.g., the motion planner 510) to generate a trajectory for a vehicle (e.g., an autonomous vehicle such as vehicles 102a-102n, vehicles 200, and/or the like).

Figure 8:
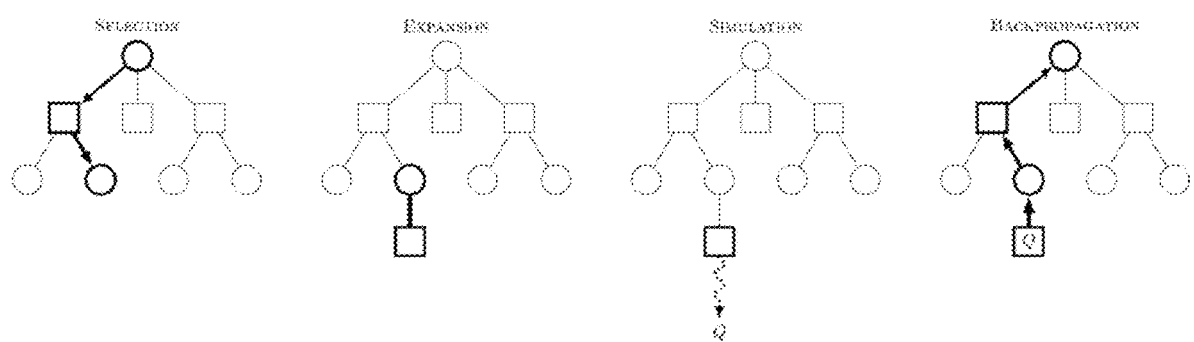
FIG. 8 is a schematic diagram illustrating an example of a Monte Carlo tree search (MCTS)

Referring to FIG. 8, a Monte Carlo tree search (MCTS) of an abstract space parameterized by one or more control parameters of the vehicle may include traversing a search tree in which the nodes of the search tree are representative different control parameters (e.g., velocity, acceleration, jerk, and snap) and the edges interconnecting the nodes are representative of actions (e.g., brake, accelerate, yaw, and/or the like) that trigger transitions between successive nodes. For example, nodes in the search tree may correspond to various states of the vehicle and its surroundings, which include any other vehicles nearby. The states of the vehicle and its surrounding may also include historical data, meaning that the states are not limited to the current states of the vehicle and its surroundings at any single point in time but also the prior states of the vehicle and its surroundings (e.g., the previous 2 seconds and/or the like). One or more actions may trigger a transition from a current state into one or more hypothetical future states. Either states or actions may be formed in part or in whole of abstract control parameters. For instance, a state may include the physical location of the vehicle while an action may include one or more abstract control parameter values (e.g., jerk and/or the like), in some cases, as a linear function of time. The next state for a given action may then be computed by solving an initial value problem. Alternatively, the actions may be defined as sums of basis functions (e.g., Tchebyshev polynomials, sinusoids, and/or the like) describing either the future positions or velocities of the vehicle, in which case the abstract control parameters may be the weights used to combine those basis functions.

As shown in FIG. 8, the Monte Carlo tree search of the abstract space may include selecting a trajectory (e.g., a sequence of control parameters) from an explored portion of the abstract space. Alternatively, the Monte Carlo tree search of the abstract space may include further exploring an unexplored portion of the abstract space and determining whether to select a trajectory therefrom. For example, as shown in FIG. 8A, exploring an unexplored portion of the abstract space may include expanding the search tree to include one or more additional children nodes, which may descend from nodes in the explored portion of the abstract space. In the case of a Monte Carlo tree search, the expansion of the search tree may be performed based on a random sampling of the abstract space, meaning that the additional children nodes are selected at random.

Upon expanding the search tree, the exploration of the unexplored portion of the abstract space may further include performing one or more simulations (e.g., the simulation 550) to generate a simulated trajectory including a sequence of control parameters (e.g., a sequence of proposed actions 556 that each triggers a transition from the current simulated state 554 to the next simulated state 558). An action and the transition from a first node corresponding to a first control parameter to a second node corresponding to a second control parameter triggered by the action may be associated with a reward Q (e.g., the scalar reward 560) as determined by a reward function (e.g., the reward function 522). As shown in FIG. 8A, the scalar rewards Q associated each transition included in the simulated trajectory may be determined during the backpropagation phase of the Monte Carlo tree search (MCTS).

In some embodiments, upon determining an abstract space representation of a trajectory for the vehicle (e.g., by performing an Monte Carlo tree search of the abstract space), the motion planner (e.g., the motion planner 510) may determine a physical space representation of the trajectory. Whereas the abstract space representation of the trajectory may include a sequence of control parameters such as velocity, acceleration, jerk, or snap, the physical space representation of the trajectory may include a sequence of positions such as two-dimensional or three-dimensional spatial coordinates. The sequence of control parameters may be mapped to the sequence of positions by solving an initial value problem in which a first function mapping the sequence of control parameters to discrete time steps is integrated to generate a second function mapping the sequence of positions to discrete time steps. The second function mapping the sequence of positions to discrete time steps may be further determined based on one or more initial conditions associated with the vehicle.

Figure 9:
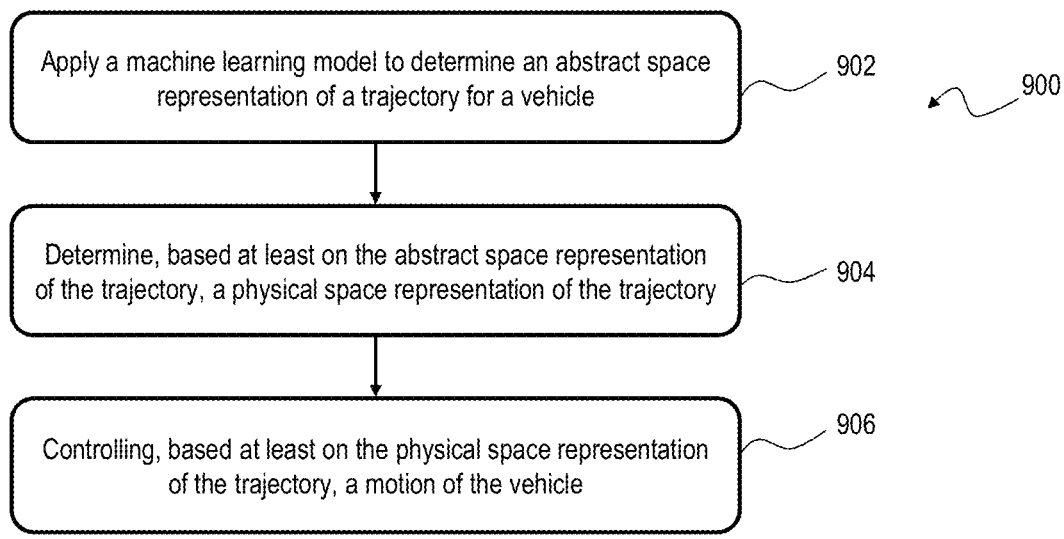
FIG. 9 depicts a flowchart illustrating an example of a process for generating a trajectory for a vehicle based on an abstract space.

Referring now to FIG. 9, which depicts a flowchart illustrating an example of a process 900 generating a trajectory for a vehicle (e.g., an autonomous vehicle) based on an abstract space. In some embodiments, one or more of the operations described with respect to process 900 are performed (e.g., completely, partially, and/or the like) by motion planner 510. Additionally, or alternatively, in some embodiments one or more steps described with respect to process 1000 are performed (e.g., completely, partially, and/or the like) by another device or group of devices separate from or including motion planner 510.

At 902, a machine learning model may be applied to determine an abstract space representation of a trajectory for a vehicle. For example, a machine learning model (e.g., the machine learning model 512) may be applied to determine an abstract space representation of a trajectory for a vehicle (e.g., an autonomous vehicle such as vehicles $102a$-$102n$, vehicles 200, and/or the like) that includes a sequence of control parameters such as a first control parameter of the vehicle (e.g., a first velocity, acceleration, jerk, or snap) at a first time $t_1$ followed by a second control parameter of the vehicle (e.g., a second velocity, acceleration, jerk, or snap) at a second time $t_2$. In some embodiments, application of the machine learning model (e.g., the machine learning model 512) may include performing a Monte Carlo tree search (MCTS) of an abstract space parameterized by one or more control parameters of the vehicle. The Monte Carlo tree search may include traversing a search tree in which the nodes of the search tree are representative different control parameters (e.g., velocity, acceleration, jerk, and snap) and the edges interconnecting the nodes are representative of actions (e.g., brake, accelerate, yaw, and/or the like) that trigger transitions between successive nodes. Moreover, the Monte Carlo tree search may include selecting, from an explored portion or an unexplored portion of the search tree, a trajectory having a maximum cumulative reward based on a reward function (e.g., the reward function 522) learned through demonstration of an expert behavior.

At 904, a physical space representation of the trajectory may be determined based on the abstract space representation of the trajectory. In some embodiments, the abstract space representation of the trajectory, which includes a sequence of control parameters associated with the vehicle, may be mapped to a physical space representation of the trajectory that includes a sequence of positions of the vehicle. For example, the first control parameter of the vehicle (e.g., a first velocity, acceleration, jerk, or snap) at the first time $t_1$ and the second control parameter of the vehicle (e.g., a second velocity, acceleration, jerk, or snap) at the second time $t_2$ may be mapped to a first position of the vehicle at the first time $t_1$ and the second position of the vehicle at the second time $t_2$. The mapping from the sequence of control parameters to the sequence of positions may be accomplished by solving an initial value problem in which a first function mapping the sequence of control parameters to discrete time steps is integrated to generate a second function mapping the sequence of positions to discrete time steps. Furthermore, the second function mapping the sequence of positions to discrete time steps may be further determined based on one or more initial conditions associated with the vehicle.

At 906, a motion of the vehicle may be controlled based on the physical space representation of the trajectory. In some embodiments, the physical space representation of the trajectory, which includes a sequence of positions of the vehicle, may correspond to a sequence of actions (e.g., the sequence of actions 520) for navigating the vehicle (e.g., an autonomous vehicle such as vehicles 102a-102n, vehicles 200, and/or the like) a selected path. For example, referring again to FIG. 5A, the trajectory generated by applying the machine learning model (e.g., the machine learning model 512) may be provided to the drive-by-wire component 514 for execution.

As described above, the abstract space and the search thereof may be constrained to reflect one or more kinematic constraints and/or physical constraints associated with the vehicle, for example, by excluding control parameters (e.g., velocity, acceleration, jerk, or snap) that are physically infeasible for the vehicle or are associated with undesirable characteristics (e.g., poor ride quality or comfort). In doing so, the trajectory that is identified based on the abstract space may be more compatible with the vehicle and more consistent with expert policies while exhibiting fewer and less prominent artifacts. Accordingly, the vehicle (e.g., the drive-by-wire component) may execute the sequence of actions (e.g., the sequence of actions 520) included in the trajectory to navigate the vehicle in a manner that avoids collision with other objects present in the vehicle's surrounding environment. Moreover, the trajectory generated based on the abstract space may enable the vehicle to operate in accordance with other desirable characteristics such as path length, ride quality or comfort, required travel time, observance of traffic rules, adherence to driving practices, and/or the like.

According to some non-limiting embodiments or examples, provided is a method, comprising: applying, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determining, using the at least one data processor, a physical space representation of the trajectory by at least mapping the sequence of control parameters to a sequence of positions for the vehicle; and controlling, using the at least one data processor, a motion of the vehicle based at least on the physical space representation of the trajectory.

According to some non-limiting embodiments or examples, provided is a system, comprising: at least one processor, and at least one non-transitory storage media storing instructions that, when executed by the at least one processor, cause the at least one processor to: apply, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determine, using the at least one data processor, a physical space representation of the trajectory by at least mapping the sequence of control parameters to a sequence of positions for the vehicle; and control, using the at least one data processor, a motion of the vehicle based at least on the physical space representation of the trajectory.

According to some non-limiting embodiments or examples, provided is at least one non-transitory computer-readable medium comprising one or more instructions that, when executed by at least one processor, cause the at least one processor to: apply, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determine, using the at least one data processor, a physical space representation of the trajectory by at least mapping the sequence of control parameters to a sequence of positions for the vehicle; and control, using the at least one data processor, a motion of the vehicle based at least on the physical space representation of the trajectory.

Further non-limiting aspects or embodiments are set forth in the following numbered clauses:

Clause 1: A method, comprising: applying, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determining, using the at least one data processor, a physical space representation of the trajectory by at least mapping the sequence of control parameters to a sequence of positions for the vehicle; and controlling, using the at least one data processor, a motion of the vehicle based at least on the physical space representation of the trajectory.

Clause 2: The method of clause 1, wherein each transition between successive nodes comprises an action that is associated with a reward determined by a reward function, and wherein the search is performed based on the reward function such that the sequence of control parameters comprising the abstract space representation of the trajectory is associated with a maximum cumulative reward.

Clause 3: The method of clause 2, further comprising: training, using the at least one data processor, the machine learning model to learn the reward function based on one or more demonstrations of expert behavior.

Clause 4: The method of clause 3, wherein the machine learning model is trained by applying one or more of inverse reinforcement learning (IRL), associative reinforcement learning, deep reinforcement learning, safe reinforcement learning, and partially supervised reinforcement learning (PSRL)

Clause 5: The method of any of clauses 2 to 4, wherein the search of the search tree is confined, based on one or more kinematic constraints and/or physical constraints associated with the vehicle, to prevent one or more control parameter values from being included in the abstract space representation of the trajectory.

Clause 6: The method of any of clauses 1 to 5, wherein the abstract space representation of the trajectory and the physical space representation of the trajectory are determined based on one or more initial conditions of the vehicle.

Clause 7: The method of any of clauses 1 to 6, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

Clause 8: The method of any of clauses 1 to 7, wherein the sequence of control parameters include a first control parameter of the vehicle at a first time and a second control parameter of the vehicle at a second time.

Clause 9: The method of clause 8, wherein the first control parameter and the second control parameter each comprise a derivative of a position of the vehicle.

Clause 10: The method of any of clauses 8 to 9, wherein the first control parameter and the second control parameter each comprise a velocity, an acceleration, a jerk, or a snap.

Clause 11: The method of any of clauses 8 to 10, wherein the first control parameter and the second control parameter each comprise a low-degree polynomial representation of a velocity, an acceleration, a jerk, or a snap.

Clause 12: The method of any of clauses 1 to 11, wherein the sequence of positions include a first position of the vehicle at a first time and a second position of the vehicle at a second time.

Clause 13: The method of clause 12, wherein the first position and the second position each comprise a set of two-dimensional spatial coordinates or a set of three-dimensional spatial coordinates.

Clause 14: A system, comprising: at least one processor, and at least one non-transitory storage media storing instructions that, when executed by the at least one processor, cause the at least one processor to: apply, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determine, using the at least one data processor, a physical space representation of the trajectory by at least mapping the sequence of control parameters to a sequence of positions for the vehicle; and control, using the at least one data processor, a motion of the vehicle based at least on the physical space representation of the trajectory.

Clause 15: The system of clause 14, wherein each transition between successive nodes comprises an action that is associated with a reward determined by a reward function, and wherein the search is performed based on the reward function such that the sequence of control parameters comprising the abstract space representation of the trajectory is associated with a maximum cumulative reward.

Clause 16: The system of clause 15, wherein the operations further comprise: training, using the at least one data processor, the machine learning model to learn the reward function based on one or more demonstrations of expert behavior.]

Clause 17: The system of clause 16, wherein the machine learning model is trained by applying one or more of inverse reinforcement learning (IRL), associative reinforcement learning, deep reinforcement learning, safe reinforcement learning, and partially supervised reinforcement learning (PSRL).

Clause 18: The system of any of clauses 14 to 17, wherein the search of the search tree is confined, based on one or more kinematic constraints and/or physical constraints associated with the vehicle, to prevent one or more control parameter values from being included in the abstract space representation of the trajectory.

Clause 19: The system of any of clauses 14 to 18, wherein the abstract space representation of the trajectory and the physical space representation of the trajectory are determined based on one or more initial conditions of the vehicle.

Clause 20: The system of any of clauses 14 to 19, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

Clause 21: The system of any of clauses 14 to 20, wherein the sequence of control parameters include a first control parameter of the vehicle at a first time and a second control parameter of the vehicle at a second time.

Clause 22: The system of clause 21, wherein the first control parameter and the second control parameter each comprise a derivative of a position of the vehicle.

Clause 23: The system of any of clauses 21 to 22, wherein the first control parameter and the second control parameter each comprise a velocity, an acceleration, a jerk, or a snap.

Clause 24: the system of any of clauses 21 to 23, wherein the first control parameter and the second control parameter each comprise a low-degree polynomial representation of a velocity, an acceleration, a jerk, or a snap.

Clause 25: The system of any of clauses 14 to 24, wherein the sequence of positions include a first position of the vehicle at a first time and a second position of the vehicle at a second time.

Clause 26: The system of clause 25, wherein the first position and the second position each comprise a set of two-dimensional spatial coordinates or a set of three-dimensional spatial coordinates.

Clause 27: At least one non-transitory storage media storing instructions that, when executed by at least one processor, cause the at least one processor to: apply, using at least one data processor, a machine learning model to determine an abstract space representation of a trajectory for a vehicle, the abstract space representation of the trajectory including a sequence of control parameters associated with the vehicle, the machine learning model determining the abstract space representation of the trajectory by at least performing a Monte Carlo Tree Search (MCTS) of a search tree having a plurality of nodes representative of a plurality of different control parameters; determine, using the at least one data processor, a physical space representation of the trajectory by at least mapping the sequence of control parameters to a sequence of positions for the vehicle; and control, using the at least one data processor, a motion of the vehicle based at least on the physical space representation of the trajectory.

Clause 28: The at least one non-transitory storage media of clause 27, wherein the search of the search tree is confined, based on one or more kinematic constraints and/or physical constraints associated with the vehicle, to prevent one or more control parameter values from being included in the abstract space representation of the trajectory.

Clause 29: The at least one non-transitory storage media of any clauses 27 to 28, wherein the abstract space representation of the trajectory and the physical space representation of the trajectory are determined based on one or more initial conditions of the vehicle.

Clause 30: The at least one non-transitory storage media of any of clauses 27 to 29, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   applying, using at least one data processor, a machine learning model to determine an abstract space representation of a trajectory for a vehicle, the abstract space representation of the trajectory including a sequence of control parameters associated with the vehicle, each control parameter in the sequence of control parameters corresponding to a derivative of a position of the vehicle, the machine learning model determining the abstract space representation of the trajectory by at least performing a Monte Carlo Tree Search (MCTS) of a search tree having a plurality of nodes representative of a plurality of different control parameters;
   determining, using the at least one data processor, a physical space representation of the trajectory by at least mapping the sequence of control parameters to a sequence of positions for the vehicle; and
   controlling, using the at least one data processor, a motion of the vehicle based at least on the physical space representation of the trajectory.

2. The method of claim 1, wherein each transition between successive nodes comprises an action that is associated with a reward determined by a reward function, and wherein the search is performed based on the reward function such that the sequence of control parameters comprising the abstract space representation of the trajectory is associated with a maximum cumulative reward.

3. The method of claim 2, further comprising:
   training, using the at least one data processor, the machine learning model to learn the reward function based on one or more demonstrations of expert behavior.

4. The method of claim 3, wherein the machine learning model is trained by applying one or more of inverse reinforcement learning (IRL), associative reinforcement learning, deep reinforcement learning, safe reinforcement learning, and partially supervised reinforcement learning (PSRL).

5. The method of claim 2, wherein the search of the search tree is confined, based on one or more kinematic constraints and/or physical constraints associated with the vehicle, to prevent one or more control parameter values from being included in the abstract space representation of the trajectory.

6. The method of claim 1, wherein the abstract space representation of the trajectory and the physical space representation of the trajectory are determined based on one or more initial conditions of the vehicle.

7. The method of claim 1, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

8. The method of claim 1, wherein the sequence of control parameters include a first control parameter of the vehicle at a first time and a second control parameter of the vehicle at a second time.

9. The method of claim 1, wherein each control parameter in the sequence of control parameters comprise a velocity, an acceleration, a jerk, or a snap.

10. The method of claim 1, wherein each control parameter in the sequence of control parameters further comprise a low-degree polynomial modeling a change in two or more successive control parameters.

11. The method of claim 1, wherein the sequence of positions include a first position of the vehicle at a first time and a second position of the vehicle at a second time.

12. The method of claim 11, wherein the first position and the second position each comprise a set of two-dimensional spatial coordinates or a set of three-dimensional spatial coordinates.

13. A system, comprising:
   at least one processor, and
   at least one non-transitory storage media storing instructions that, when executed by the at least one processor, cause the at least one processor to:
      apply a machine learning model to determine an abstract space representation of a trajectory for a vehicle, the abstract space representation of the trajectory including a sequence of control parameters associated with the vehicle, each control parameter in the sequence of control parameters corresponding to a derivative of a position of the vehicle, the machine learning model determining the abstract space representation of the trajectory by at least performing a Monte Carlo Tree Search (MCTS) of a search tree having a plurality of nodes representative of a plurality of different control parameters;
      determine a physical space representation of the trajectory by at least mapping the sequence of control parameters to a sequence of positions for the vehicle; and
      control a motion of the vehicle based at least on the physical space representation of the trajectory.

14. The system of claim 13, wherein each transition between successive nodes comprises an action that is associated with a reward determined by a reward function, and wherein the search is performed based on the reward function such that the sequence of control parameters comprising the abstract space representation of the trajectory is associated with a maximum cumulative reward.

15. The system of claim 14, wherein the operations further comprise:
    training, using the at least one data processor, the machine learning model to learn the reward function based on one or more demonstrations of expert behavior.

16. The system of claim 15, wherein the machine learning model is trained by applying one or more of inverse reinforcement learning (IRL), associative reinforcement learning, deep reinforcement learning, safe reinforcement learning, and partially supervised reinforcement learning (PSRL).

17. The system of claim 13, wherein the search of the search tree is confined, based on one or more kinematic constraints and/or physical constraints associated with the vehicle, to prevent one or more control parameter values from being included in the abstract space representation of the trajectory.

18. The system of claim 13, wherein the abstract space representation of the trajectory and the physical space representation of the trajectory are determined based on one or more initial conditions of the vehicle.

19. The system of claim 13, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

20. The system of claim 13, wherein the sequence of control parameters include a first control parameter of the vehicle at a first time and a second control parameter of the vehicle at a second time.

21. The system of claim 13, wherein each control parameter in the sequence of control parameters comprise a velocity, an acceleration, a jerk, or a snap.

22. The system of claim 13, wherein each control parameter in the sequence of control parameters further comprise a low-degree polynomial modeling a change in two or more successive control parameters.

23. The system of claim 13, wherein the sequence of positions include a first position of the vehicle at a first time and a second position of the vehicle at a second time.

24. The system of claim 23, wherein the first position and the second position each comprise a set of two-dimensional spatial coordinates or a set of three-dimensional spatial coordinates.

25. At least one non-transitory storage media storing instructions that, when executed by at least one processor, cause the at least one processor to:
    apply, using at least one data processor, a machine learning model to determine an abstract space representation of a trajectory for a vehicle, the abstract space representation of the trajectory including a sequence of control parameters associated with the vehicle, each control parameter in the sequence of control parameters corresponding to a derivative of a position of the vehicle, the machine learning model determining the abstract space representation of the trajectory by at least performing a Monte Carlo Tree Search (MCTS) of a search tree having a plurality of nodes representative of a plurality of different control parameters;
    determine, using the at least one data processor, a physical space representation of the trajectory by at least mapping the sequence of control parameters to a sequence of positions for the vehicle; and
    control, using the at least one data processor, a motion of the vehicle based at least on the physical space representation of the trajectory.

26. The at least one non-transitory storage media of claim 25, wherein the search of the search tree is confined, based on one or more kinematic constraints and/or physical constraints associated with the vehicle, to prevent one or more control parameter values from being included in the abstract space representation of the trajectory.

27. The at least one non-transitory storage media of claim 25, wherein the abstract space representation of the trajectory and the physical space representation of the trajectory are determined based on one or more initial conditions of the vehicle.

28. The at least one non-transitory storage media of claim 25, wherein the sequence of control parameters is mapped to the sequence of positions for the vehicle by at least integrating a first function corresponding to the sequence of control parameters and determining, based at least on the integrated first function and one or more initial conditions of the vehicle, a second function corresponding to the sequence of positions.

* * * * *